Patented Nov. 8, 1938

2,136,217

UNITED STATES PATENT OFFICE 2,136,217

CONDENSATION PROCESS

Walter Mitchell, Norton-on-Tees, England, assignor to Imperial Chemical Industries, Limited, a corporation of Great Britain No Drawing. Application August 24, 1935, Serial No. 37,684

11 Claims. (Cl. 260—2)

This invention relates to an improved condensation process. More particularly it relates to an improved method for condensing acetylene with organic hydroxyl compounds. Still more particularly it relates to an improved catalyst for such condensation reactions of acetylene.

This application is a continuation-in-part of an application Serial No. 751,967, filed November 7, 1934.

It is well known that acetylene reacts with organic hydroxyl compounds in the presence of mercury salts and strong acids. For example, dimethyl acetyl has been prepared by the passage of acetylene into methyl alcohol containing a quantity of concentrated sulfuric acid and a small amount of mercury sulfate, but the yield is poor, and unless the temperature of the reactants is kept below 12° C. the reaction is violent and leads largely to polymerized products. Similarly, the condensation of phenols with acetylene has been effected in the presence of strong sulfuric acid and mercury salts. It has been proposed to use mercury salts as catalysts for the production of ethers and esters of ethylidene glycol and vinyl alcohol, and the preparation of resinous products by condensation of acetylene with non-phenolic organic compounds in the presence of mercury salts, and at elevated temperatures, has also been described.

It is an object of this invention to provide an improved condensation process. It is a further object of this invention to provide an improved condensation catalyst. It is a still further object of this invention to provide an improved method for reacting acetylene with organic hydroxy compounds such as alcohols and phenols. Other objects will appear hereinafter.

According to the present invention condensation products are produced by reacting acetylene with organic compounds containing hydroxyl groups such as, for example, the lower aliphatic alcohols, glycols, glycerol and phenols, in the presence of freshly precipitated mercuric sulfate as a catalyst. Preferably, the catalyst is obtained by precipitation from a solution of an organic mercury salt, for example, by adding concentrated sulfuric acid to a solution of mercuric acetate, the precipitate being separated and washed until free from acid.

I have found that by the use of the freshly precipitated mercuric sulfate the presence of a strong acid is no longer essential for carrying out the reaction, and thus it is possible to simplify to a marked extent the operations involved in working up the reaction products, in particular the neutralization of large amounts of acid is rendered unnecessary. Moreover, we have found that the use of the freshly precipitated catalysts in the absence of strong acid eliminates to a large extent the production of undesirable, tarry matter. A particular class of alcohols contemplated by the present invention are the monohydric unsubstituted aliphatic alcohols.

The products vary in type according to the nature of the organic compound with which the acetylene reacts. In general, it may be said that when the hydroxyl group is attached to an aliphatic grouping, liquid reaction products are obtained, whereas if the acetylene is reacted with a phenolic body, resinous condensation products result.

The following examples illustrate the manner in which the invention may be carried out. They are not to be construed as limiting the scope of the invention.

Example 1

A catalyst was prepared by dissolving 40 grams of commercial red mercuric oxide in the minimum quantity of glacial acetic acid at a temperature of 30–50° C., and then adding 20 grams of concentrated sulfuric acid (a slight excess) to precipitate mercuric sulfate. The mixture was diluted with methyl alcohol, the precipitate filtered off, washed free from acid with methyl alcohol, and then dried to give 55 grams of mercuric sulfate catalyst.

This catalyst was added to 710 grams of pure methyl alcohol contained in a closed vessel and acetylene was passed in with thorough agitation until 98% of the theoretical quantity for the formation of dimethyl acetal had been absorbed. The acetylene was absorbed very readily at the rate of 105 liters per hour, with evolution of heat. When the temperature had risen to 50–55° C. it was maintained at this point by the application of cooling water to the outside of the vessel. When the desired quantity of acetylene had been introduced the liquor was decanted from the catalyst-containing sludge. The crude product weighing 955 grams was treated with 2 grams of sodium bicarbonate in order to neutralize traces of acid produced during the reaction, and it was then distilled from a water-bath. On distillation, 2 grams of volatile product boiling below 56° C. were obtained, followed by 860 grams of almost pure dimethyl acetal between 56° C. and 64° C., leaving 93.5 grams of tar behind. The yield of dimethyl acetal from the methyl alcohol used was therefore 86%.

The sludge left after the removal of the crude product was still an active catalyst for the reaction and was used for the production of a further batch of dimethyl acetal.

For purposes of comparison the following experiment was done using the hitherto known method for the production of dimethyl acetal from acetylene.

55 grams of the mercuric sulfate catalyst prepared as above were added to 709 grams of methanol along with 100 grams of cencentrated sulfuric acid. Acetylene was passed into the well-stirred mixture until 98% of the theoretical amount had been absorbed. Before distilling the reaction product in this case, it was necessary to add 200 grams of sodium carbonate to neutralize the sulfuric acid used, and on distillation of the decanted liquor, weighing 935 grams, there were obtained 60 grams of volatile distillate boiling up to 55° C., 550 grams boiling between 56 and 61° C., containing 93% of dimethyl acetal and 7% of methyl alcohol, and finally a tarry residue amounting to 320 grams was left. The yield of dimethyl acetal on the methanol used was therefore 51%.

Example 2

40 grams of the mercuric sulfate catalyst prepared as in Example 1 were added to 428 grams of glycerol and acetylene was passed in until no more was absorbed. In this case it was found advisable to maintain the reaction mixture at 60–90° C. in order to render the glycerol less viscous and more easily stirred. The reaction product was filtered from sludge, neutralized with a small amount of sodium bicarbonate, filtered and distilled. A small fraction amounting to 25 grams was obtained below 183° C. and 420 grams of glycerol acetal between 183–192° C. Yield 76%.

Example 3

20 grams of the mercuric sulfate catalyst prepared as in Example 1 were added to 210 grams of benzyl alcohol and acetylene was passed in with stirring. The reaction temperature was maintained at about 40° C. The absorption of acetylene ceased when 1 mole of acetylene per 2 moles of alcohol had reacted. The reaction product was filtered from sludge, neutralized with a small quantity of sodium bicarbonate, filtered and distilled.

A small fraction (4%) was obtained below 205° C. and 35% boiling between 205 and 230° C. (mainly unchanged benzyl alcohol). The temperature then rose sharply to 300° C. where 50% of the product distilled as a light yellow liquid. A tarry residue amounting to about 10% was left.

Example 4

2 grams of the mercuric sulfate catalyst prepared as in Example 1 were added to 50 grams of phenol warmed to 80–90° C. and acetylene was passed into the well stirred mixture, the heat of reaction raising the temperature to about 110° C. The reaction ceased when 1 mole of acetylene per 2 moles of phenol had been absorbed. The reddish-brown liquid was steam-distilled to remove unchanged phenol, dissolved in methyl alcohol, filtered free of sludge and then freed from solvent under vacuum at 120–140° C.

A ruby-red, rather brittle resin melting at 120–130° C. was obtained in almost quantitative yield.

The above examples illustrate the preparation of the new catalyst and its use with various types of organic hydroxy compounds. It is stated that the catalyst is freshly precipitated. This is to be interpreted to mean prepared within a reasonable time before use, as for example, in contrast to the use of a commercial mercuric sulfate. Although the method for preparing the catalyst, which is described in Example 1, is a preferred method, it may be varied within reasonable limits which will be obvious to the ordinary chemist. Any raw materials, such as other salts of mercury and other solvents than acetic acid, such, for example, as other organic acids, may be brought together with the sulfuric acid at the desired temperature, so long as the final product is a substantially acid free mercuric sulfate. The presence of inert diluents is not undesirable and may in certain cases be beneficial.

The new catalyst has been found to be useful, generally, in condensation reactions involving acetylene and an organic hydroxy compound such as an alcohol or a phenol. Very good yields of product have been obtained by reacting acetylene with the lower aliphatic alcohols both mono- and poly-hydroxy, the aromatic substituted aliphatic alcohols, such as benzyl alcohol as well as with phenol. The invention is not limited to these particular alcohols and phenols, however. Higher aliphatic alcohols and phenols, mono- or polyhydroxy, as well as substituted may be reacted with acetylene according to the process of the present invention. The substituents which may be contained in the alcohol or phenol are many in number.

According to the preferred method the catalyst is added to the alcohol or phenol and the acetylene gas is then passed into this mixture. The invention is not limited to this mode of procedure, however. The acetylene may be brought into contact with the alcohol or phenol in the presence of the new catalyst in any convenient manner. In fact, it may be said in general that this new catalyst, described in the present application, may be substituted in prior art processes for condensing acetylene with alcohols or phenols, for the previously known mercuric sulfate catalysts. It may be necessary or desirable however, to modify the reaction conditions slightly to obtain the best results.

Preferably acetylene is passed into the reaction mixture until approximately 98% of the theoretical quantity for the particular reaction has been absorbed. Wide variations from this procedure are, nevertheless, within the scope of the present invention. It will be noted that ordinarily with monohydric alcohols and phenols one-half mol of acetylene is added for each mol of alcohol or phenol. A quantity, either considerably greater or less than the theoretical quantity of acetylene may be used if desired.

The invention is, likewise, not limited to the use of pure alcohols or phenols. The presence of inert diluents is usually not objectionable. Moreover mixtures of alcohols and phenols may be used in place of a single chemical individual. It is obvious of course from the above discussion that conversely the quantity of alcohol or phenol to be reacted with the acetylene may likewise vary widely.

For purposes of illustration the amount of catalyst to be employed will be discussed with reference to the amount of alcohol or phenol used but it is to be understood that it does not necessarily depend on the amount of alcohol or phenol. It will be noted from the examples that the amount of catalyst to be used may be varied widely with reference to the amount of alcohol or phenol used. The same is true with regard to the amount of acetylene to be used. The quantity of catalyst will likewise vary with the particular alcohol or phenol used as well as with variations in reaction conditions. Under a given set of conditions for given reactants even, the amount of catalyst may be varied if desired. The examples illustrate preferred proportions. From these illustrations one skilled in the art may readily determine the amount of catalyst to be used in any given case.

Under preferred operating conditions the rate of addition of the acetylene is determined by the rate at which it is absorbed. The reaction need not be carried out in this manner, however. The rate of addition of the acetylene may be varied as desired or it may be all added at one time.

Many of the reactions with which the present invention is concerned are exothermic. Accordingly, as indicated by the examples, it is frequently desirable to cool the reaction mixture in order to maintain the temperature at the desired point. In other cases the reaction does not produce sufficient heat to raise its temperature to the desired point, in which case it may be found advisable to supply additional heat.

The examples serve to emphasize the fact that various temperatures may be maintained during the reaction. Preferred temperatures for particular reactants are given in the various examples. It will be noted that these temperatures vary rather widely. Different reactants usually produce the best results at different temperatures. The invention is not to be limited to the particular temperatures mentioned. The temperature may be varied for a given reactant or for different reactants with satisfactory results. Temperatures ranging from 50° C. to 110° C. are specifically disclosed but this preferred range is not to be considered a limitation of the invention. Both higher and lower temperatures covering a wide range are within the scope of the invention.

The catalyst, as pointed out in the examples, is not exhausted after a single operation but may be used to assist in further condensations. In fact the sludge remaining after the crude reaction product is separated and containing the catalyst may be added to a further quantity of reactants to catalyze their condensation. Preferably, however, it will be used to catalyze the same reaction for which it was at first used, although this is not necessary.

When the reaction is completed the crude reaction product is separated from the catalyst as, for example, by decantation. The desired reaction product may then be separated from the crude, for example, by fractional distillation. The crude reaction product may be neutralized with, for example, sodium bicarbonate, before distillation, if desired.

The advantages of the new catalyst and improvements which it permits in the condensation process should be apparent from the above description. The elimination of the necessity for using a large quantity of strong acid together with the increased yields obtainable make the use of the new catalyst and process a real advance in the art. The various operations of the process are simplified and in addition the yield of product is increased. Undesirable side reactions are eliminated to a large extent.

It is apparent that many widely different embodiments of this invention may be made without departing from the spirit and scope thereof and therefore it is not intended to be limited except as indicated in the appended claims.

I claim:

1. A process which comprises adding sulfuric acid to a mercuric salt solution which yields a precipitate of mercuric sulfate upon the addition of sulfuric acid, then washing the precipitate of mercuric sulfate until it is free of acid, and thereafter condensing acetylene with a compound of the group consisting of alcohols and phenols in the presence of the freshly precipitated mercuric sulfate.

2. A process which comprises adding sulfuric acid to a mercuric salt solution which yields a precipitate of mercuric sulfate upon the addition of sulfuric acid, then washing the precipitate of mercuric sulfate until it is free of acid, and thereafter condensing acetylene with an alcohol in the presence of the freshly precipitated mercuric sulfate.

3. A process which comprises adding sulfuric acid to a mercuric salt solution which yields a precipitate of mercuric sulfate upon the addition of sulfuric acid, then washing the precipitate of mercuric sulfate until it is free of acid, and thereafter condensing acetylene with a phenol in the presence of the freshly precipitated mercuric sulfate.

4. A process which comprises adding sulfuric acid to a mercuric oxide solution, then washing the precipitate of mercuric sulfate until it is free of acid, and thereafter condensing acetylene with an alcohol in the presence of the freshly precipitated mercuric sulfate.

5. A process which comprises adding sulfuric acid to a mercuric oxide solution, then washing the precipitate of mercuric sulfate until it is free of acid, and thereafter condensing acetylene with a phenol in the presence of the freshly precipitated mercuric sulfate.

6. A process which comprises dissolving mercuric oxide in glacial acetic acid, then adding a slight excess of concentrated sulfuric acid and separating the precipitate of mercuric sulfate so formed and washing it until it is substantially free of acid, and thereafter condensing acetylene with methyl alcohol in the presence of the freshly precipitated mercuric sulfate.

7. A process which comprises adding sulfuric acid to a mercuric salt solution which yields a precipitate of mercuric sulfate upon the addition of sulfuric acid, then washing the precipitate of mercuric sulfate until it is free of acid, and thereafter condensing acetylene with a monohydric unsubstituted aliphatic alcohol in the presence of the freshly precipitated mercuric sulfate.

8. A process which comprises adding sulfuric acid to a mercuric salt solution which yields a precipitate of mercuric sulfate upon the addition of sulfuric acid, then washing the precipitate of mercuric sulfate until it is free of acid, and thereafter condensing acetylene with a polyhydric unsubstituted aliphatic alcohol in the presence of the freshly precipitated mercuric sulfate.

9. A process which comprises dissolving mercuric oxide in glacial acetic acid, then adding a slight excess of concentrated sulfuric acid and separating the precipitate of mercuric sulfate so formed and washing it until it is substantially free of acid, and thereafter condensing acetylene with glycerol in the presence of the freshly precipitated mercuric sulfate.

10. A process which comprises dissolving mercuric oxide in glacial acetic acid, then adding a slight excess of concentrated sulfuric acid and separating the precipitate of mercuric sulfate so formed and washing it until it is substantially free of acid, and thereafter condensing acetylene with phenol in the presence of the freshly precipitated mercuric sulfate.

11. A process as described in claim 1, further characterized in that the compound of the group consisting of alcohols and phenols contains less than four hydroxyl groups.

WALTER MITCHELL.

CERTIFICATE OF CORRECTION.

Patent No. 2,136,217.                                November 8, 1938.

WALTER MITCHELL.

It is hereby certified that error appears in the printed specification of the above numbered patent requiring correction as follows: Page 1, first column, line 13, for the word "acetyl" read acetal; and that the said Letters Patent should be read with this correction therein that the same may conform to the record of the case in the Patent Office.

Signed and sealed this 27th day of December, A. D. 1938.

Henry Van Arsdale (Seal)                                              Acting Commissioner of Patents.

slight excess of concentrated sulfuric acid and separating the precipitate of mercuric sulfate so formed and washing it until it is substantially free of acid, and thereafter condensing acetylene with phenol in the presence of the freshly precipitated mercuric sulfate.

11. A process as described in claim 1, further characterized in that the compound of the group consisting of alcohols and phenols contains less than four hydroxyl groups.

WALTER MITCHELL.

CERTIFICATE OF CORRECTION.

Patent No. 2,136,217.  November 8, 1938.

WALTER MITCHELL.

It is hereby certified that error appears in the printed specification of the above numbered patent requiring correction as follows: Page 1, first column, line 13, for the word "acetyl" read acetal; and that the said Letters Patent should be read with this correction therein that the same may conform to the record of the case in the Patent Office.

Signed and sealed this 27th day of December, A. D. 1938.

Henry Van Arsdale (Seal)  Acting Commissioner of Patents.